United States Patent [19]

Demyanovich

[11] Patent Number: 4,749,580

[45] Date of Patent: Jun. 7, 1988

[54] METHOD FOR CARBONATING LIQUIDS

[76] Inventor: Robert J. Demyanovich, 1731 California #1, Berkeley, Calif. 94703

[21] Appl. No.: 818,781

[22] Filed: Jan. 13, 1986

[51] Int. Cl.[4] .......................... C12G 1/06; B65B 31/00

[52] U.S. Cl. ....................................... 426/477; 99/275; 141/5; 261/DIG. 7

[58] Field of Search .................. 426/477, 474; 99/275; 261/DIG. 7, 116, 118; 141/5, 6

[56] References Cited

U.S. PATENT DOCUMENTS 2,757,843 8/1956 Smith .................................. 426/477

OTHER PUBLICATIONS

Tamir and Rachmilev, "Absorption of $CO_2$ in a Rapid Laminar Fan-Shaped Water Sheet", Chem. Eng. J., 4 (1972), pp. 87-90.

Simpson and Lynn, Vacuum-Spray Stripping of Sparingly Soluble Gases from Aqueous Solutions;" AICHE J. (vol. 23, No. 5) (1977) pp. 670, 677.

*Primary Examiner*—George Yeung

*Attorney, Agent, or Firm*—David Pressman

[57] ABSTRACT

A method for continuously preparing a carbonated liquid is disclosed wherein a liquid is exposed to an atmosphere of carbon dioxide gas as ultrathin liquid sheets. The extremely high surface areas so exposed, coupled with turbulence within the liquid sheets, allow for high carbonation levels in just a few milliseconds. Since the carbonation of the liquid occurs on a scale of microns of liquid thickness, the carbonation is extremely uniform and subsequent liquid mixing or stabilization time is usually not required. Further, since the carbonation occurs on a time scale of milliseconds, the carbonator pressure vessel is very compact compared to its liquid throughput.

10 Claims, 4 Drawing Sheets

METHOD FOR CARBONATING LIQUIDS

FIELD OF THE INVENTION

This invention relates to a method for carbonating liquids in general and to carbonating beverages.

DISSCUSSION OF THE PRIOR ART

The carbonation of beverages has been accomplished in the industry by carbonating within a large holding tank located before the filler. Carbonation within the holding tank has been achieved by one of several methods: direct injection of carbon dioxide into the liquid; atomization of the liquid followed by absorption of carbon dioxide, and exposure of the liquid as a thin film flowing over a plate or some other surface. The liquid to be carbonated may be a mixture of beverage syrup and water or water alone. Typically the liquid is cooled before or during carbonation to about 5° to 10° C. Cooling the liquid increases the amount of carbon dioxide absorbed for a given partial pressure of carbon dioxide gas. Further such cooling generally reduces the wildness or foaminess of the beverage during the filling operation. The approach to equilibrium or degree of saturation of the liquid with carbon dioxide is typically about 60%. By only saturating the liquid to this level, the pressure within the carbonator can be used to pump the beverage to the filling machine. Incomplete saturation of the liquid with carbon dioxide prevents the formation of two-phase flow due to carbon dioxide release which could result from piping and system pressure drops ahead of the filler. Additionally, prior to carbonation, the liquid is usually deaerated in a vacuum vessel. Deaeration increases the shelf life of the beverage by removing oxygen from the liquid and reduces the wildness of the beverage during the filling operation.

A popular carbonator used by the soft drink industry is the carbo-cooler. The "carbo-cooler" simultaneously carbonates and cools the beverage as it flows over cooling plates in a thin film. The reader is referred to the text by Woodroof and Phillips, Beverages: Carbonated and Noncarbonated, 1981, p. 297. Examples of such carbonators are the Bev-O-Matic unit by Crown Cork and Seal Co. and the Mojonnier carbo-coolers by FMC Corporation. These systems require relatively large tanks that are costly since the tanks must withstand pressures of about 380 to 450 kPa (kilopascals). Further a significant amount of liquid residence time is allowed for to stabilize carbon dioxide absorption which further increases the size and cost of the pressure vessel. Finally although the prior art is able to carbonate in thin films, these films are still very large relative to the ultrathin films produced in the present invention, and only one side of the film is exposed to the carbon dioxide gas.

It has long been known that many liquid atomizers generate droplets by initially forming a thin liquid sheet that subsequently disrupts into droplets. The sheet so formed is of order ten microns in thickness and has a typical residence time of order milliseconds. Tamir and Rachmilev in Chem. Eng. J., 4 (1972), pp. 85–90 discovered that substantial carbonation of water can occur in these liquid sheets. Their experiments with laminar liquid sheets produced from fan-spray atomizers achieved carbonation levels of up to 90% of the equilibrium value in a few milliseconds. The experiments were so devised as to prevent the liquid droplets formed after disruption of the sheet from further increasing the carbonation level. The emphasis of Tamir and Rachmilev's work, however, was of a theoretical and basic research nature. Their work, although interesting, does not readily apply to carbonation on an industrial scale because of the very small fan-spray atomizers required in order to achieve a high rate of carbonation. The rate of carbonation is very dependent upon atomizer size and therefore atomizer flowrate. For example a typical 38,000 liter/hour beverage carbonator would require more than 10,000 of the fan-spray atomizers used by Tamir and Rachmilev to achieve 65% of the saturated carbonation level.

SUMMARY AND OBJECTS OF THE INVENTION

This invention relates to a method for utilizing the many advantages of ultrathin liquid sheets in a practical industrial manner. By operating the liquid sheets produced by the atomizers in turbulent flow, atomizer throughput can be increased by over 200 times without substantially decreasing the degree of carbonation. Thus the total number of atomizers required for a typical industrial use is kept to a manageable minimum. Also the extreme thinness of the liquid sheets coupled with their very short residence time allows for substantial reductions in the size of beverage carbonation equipment. Since the carbonation occurs on a scale of a few microns of liquid thickness, the carbonation is extremely uniform and subsequent liquid mixing or residence time is not required.

Accordingly it is one object of the present invention to provide a means of carbonating liquids, by producing liquid surface areas much higher than has heretofore been possible and carbonation times much shorter than heretofore possible.

It is another object of the present invention to substantially reduce the cost of the pressure vessel required for carbonating beverages or liquids.

It is a further object of the present invention to provide a means for extremely uniform carbonation of liquids so that subsequent liquid mixing or stabilization time is not required.

It is still a further object of this invention to achieve specified levels of carbonation in beverages with a high degree of accuracy.

It is an additional object of this invention to permit carbonation of beverages in modular units that are inexpensive and allow for increased turndown in beverage processing.

Other and further objects of the invention will be apparent from the following description taken in conjunction with the accompanying drawings.

DESCRIPTION OF A PREFERRED EMBODIMENT

Figure 1:
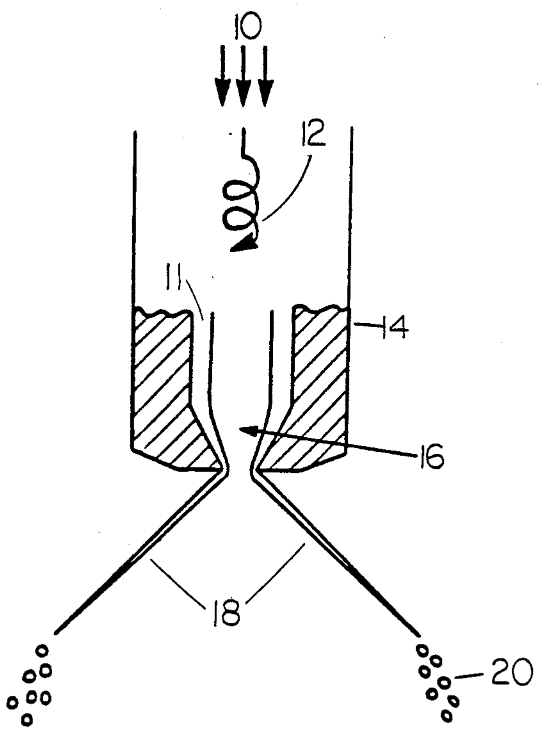
FIG. 1 is a schematic diagram illustrating sheet formation from a liquid atomizer.

In order to understand the principles upon which the present invention is based consider FIG. 1. FIG. 1 illustrates a swirl atomizer that generates droplets by the disruption of a liquid sheet. Liquid 10 enters chamber 12 where it is swirled. The swirled liquid flows at high velocity (greater than 0.5 meters/sec) as a thin film 11 with an air core 16 along the walls of the atomizer 14 until finally ejected into free space as a thin conical liquid sheet 18. At some distance beyond the atomizer the sheet breaks up into droplets 20. Because the liquid velocity and liquid flowrate within the sheet are constant but the sheet expands radially, the liquid sheet must thin. A typical water sheet at flowrates up to 11 liters/minute thins from about 500 to 1000 microns at the atomizer exit to 10 to 20 microns just prior to sheet disruption. If the flowrate is substantially smaller the liquid water sheet can become as thin as 1 to 2 microns or smaller. Because the liquid sheet thins in a geometric manner with respect to its length, most sheets are less than 60.0 microns in thickness over two-thirds of the sheet length for liquid flowrates of 11.0 liters/minute or less. Disruption into droplets occurs because surface tension forces exceed inertial forces as the sheet thins. At some point the increasing surface tension force causes the liquid to roll up on itself, generating droplets. The droplets so generated have radii that are typically fifty to one hundred times larger than the thickness of the sheet just prior to sheet breakup.

The residence time of a liquid sheet made substantially of water and having a viscosity of no more than a few centipoise is usually less than ten milliseconds. If the sheet is operated in turbulent flow this residence time decreases. Very little can be done to substantially increase the residence time of the sheet. Lowering the surface tension or increasing the viscosity can increase the residence time by a factor of two or three at the most. Therefore substantial absorption of any component within the liquid sheet must occur prior to disruption of the sheet or in a time frame of typically five to ten milliseconds or less. However, because the liquid sheets are extremely thin, diffusion within the sheets can occur in extremely short times. The following equation estimates the time required for diffusion through a thin film:

$$t=y^2/D \quad (1)$$

where t is the time required for a component to diffuse a distnce y, and D is the diffusivity of the component within the liquid. As an example the time required for carbon dioxide to diffuse ten microns in a water sheet flowing in laminar flow is approximately 50 milliseconds. This calculation is based on a diffusion coefficient of carbon dioxide in water of 0.000020 square centimeters per second at 20° C. and a water viscosity of 1.0 cP (centipoise). However, since the present invention flows the liquid sheet in turbulent flow, the molecular diffusivity is effectively increased by a factor of 20 or more. This increase is a result of mass convection of liquid in the direction of sheet thickness. Thus substantial diffusion can occur in a few milliseconds which is of the same order as the residence time. Even though the turbulent flow decreases the residence time of the liquid sheet, it increases the effective component diffusivity many times more leading to enhanced mass transfer of the absorbing component. Turbulent flow is achieved by increasing the sheet velocity which is usually accomplished by increasing the atomizer pressure drop. The transition from laminar flow to turbulent flow is indicated by a loss of glassiness when viewing the liquid sheet; instead the sheet becomes wavy in appearance.

Figure 2:
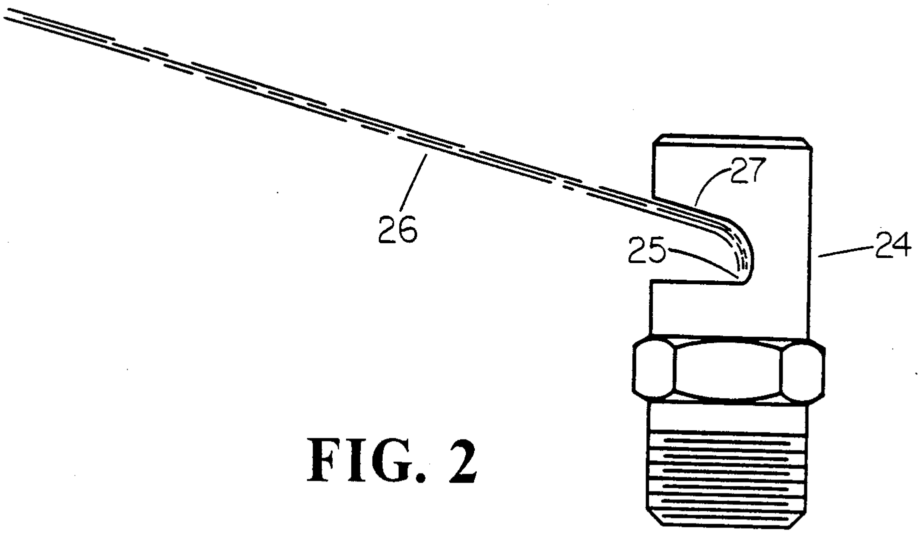
FIG. 2 is a preferred atomizer for the practice of the present invention.
Figure 3:
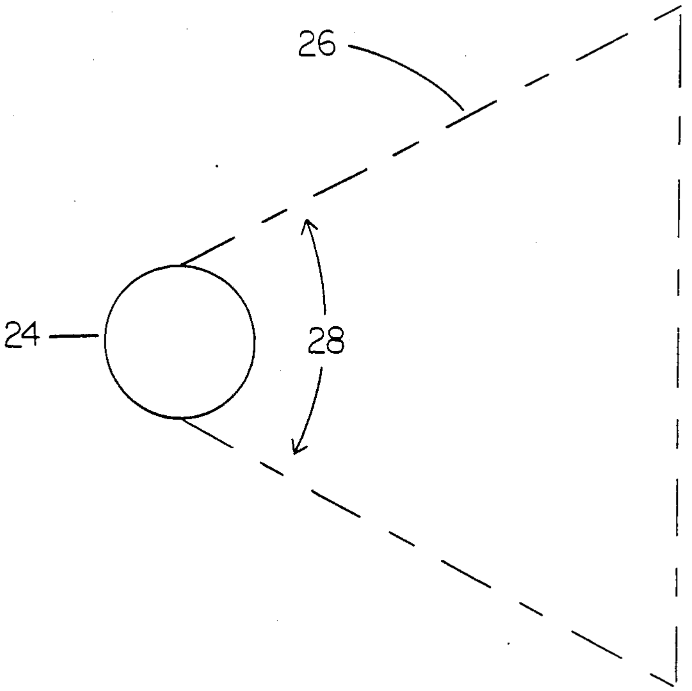
FIG. 3 is a top view of a preferred atomizer for the practice of the present invention as shown in FIG. 2.

FIG. 2 is a preferred atomizer for the practice of the present invention. The atomizer 24 is of a deflected fan-spray type which produces a sheet 26 in the shape of a fan. Liquid issuing from a jet orifice 25 impinges upon a surface 27 and is deflected as a fan sheet. FIG. 3 is a top view of the atomizer 24 shown in FIG. 2. The sheet 26 formed is in the shape of a fan of angle 28. If the angle 28 is 360°, a fully circular sheet is produced. Such an atomizer is known as a jet-impingement atomizer. The deflected fan-spray atomizer or jet-impingement atomizer essentially form a thin liquid sheet by impinging a jet of liquid at a surface. The jet is deflected by the surface and flows as a thin sheet along the surface before ejection into free space. The jet-impingement atomizer generally has a separate deflector surface from the jet orifice so that a full unobstructed circular sheet can form. Jet-impingement atomizers, however, are not as reliable as fan-spray atomizers because the deflector surface and jet orifice are not physically connected which can result in alignment problems and loss of sheet formation. If the jet of liquid does not impinge upon the deflector surface properly, no sheet will form; instead the jet will form droplets immediately. Therefore although the jet-impingement atomizer will provide a high degree of carbonation in extremely short times, it does not meet the requirements of ease of maintenance and trouble-free operation generally required for industrial applications. Further fan-spray atomizers because they produce only parts of a total circle can be arranged in a more compact manner than jet-impingement atomizers.

Figure 4:
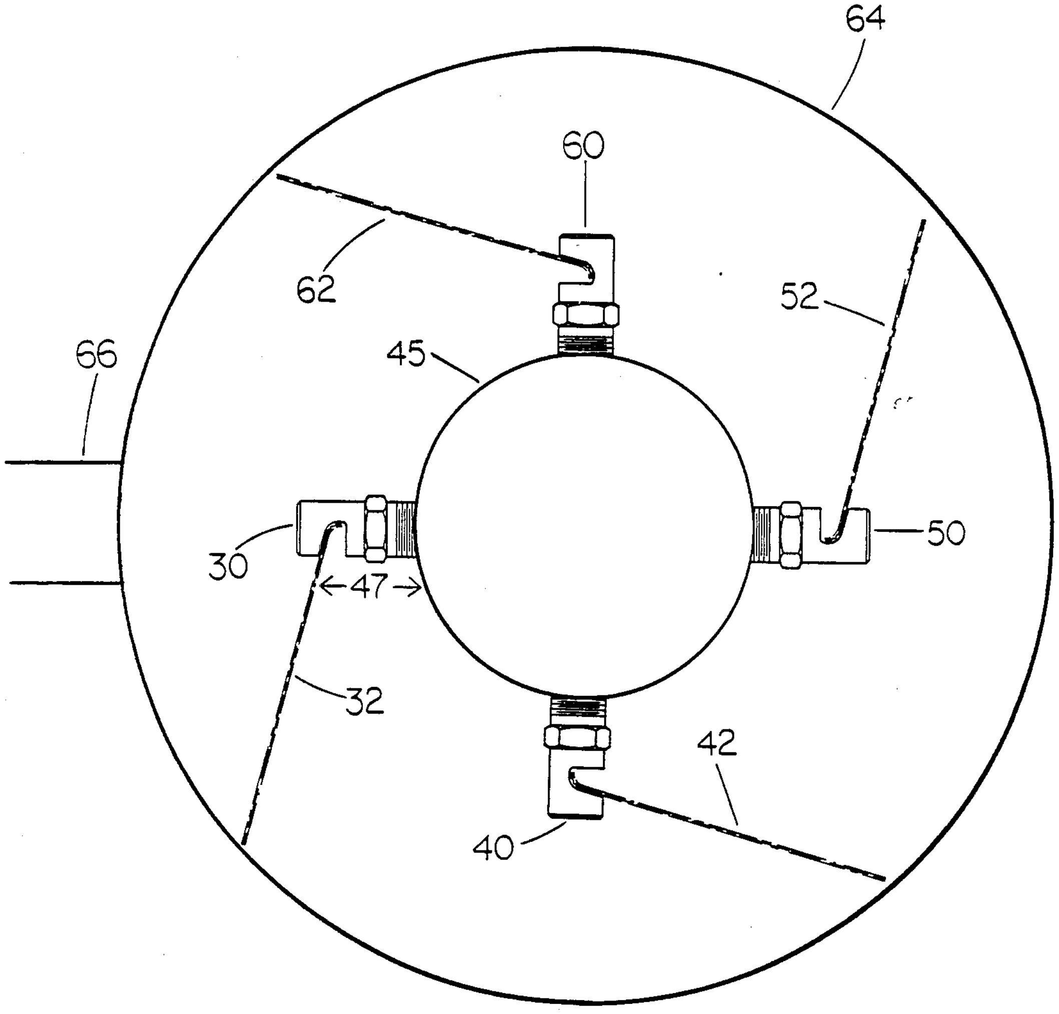
FIG. 4 is a preferred embodiment of the present invention utilizing ultrathin liquid sheets.

FIG. 4 illustrates a preferred embodiment of the present invention. Four fan-spray atomizers, 30,40,50, and 60 are arranged in a circular plane on a liquid header or feed pipe 45. The liquid to be carbonated is pumped through the liquid header pipe 45 and flows through the atomizers 30,40,50, and 60. The liquid sheets 32,42,52, and 62 exit from each atomizer at a distance 47 from the liquid header pipe 45. The entire assembly of liquid header pipe 45 with atomizers 30,40,50, and 60 is contained in a pressure vessel 64 that will, typically, be a pipe of larger diameter than 45. The pressure vessel 64 must be of sufficient diameter to allow for a sufficient sheet length for each of the atomizers. A gas consisting substantially of carbon dioxide is connected to the pressure vessel 64 through a line 66, and carbon dioxide is absorbed by the liquid sheets. In general for reliable operation, the ultrathin liquid sheets 32,42,52, and 62 should not interfere with one another. Such interference could cause premature sheet disruption into droplets and would decrease the amount of carbon dioxide absorbed. Although Example 2 and 3 demonstrates that a limited amount of sheet interference is tolerable, for reliable operation sheet interference should be nonexistent of very limited. Note that the arrangement shown in FIG. 4 makes it impossible for any of the four liquid sheets to interfere with one another, yet provides a compact design.

Figure 5:
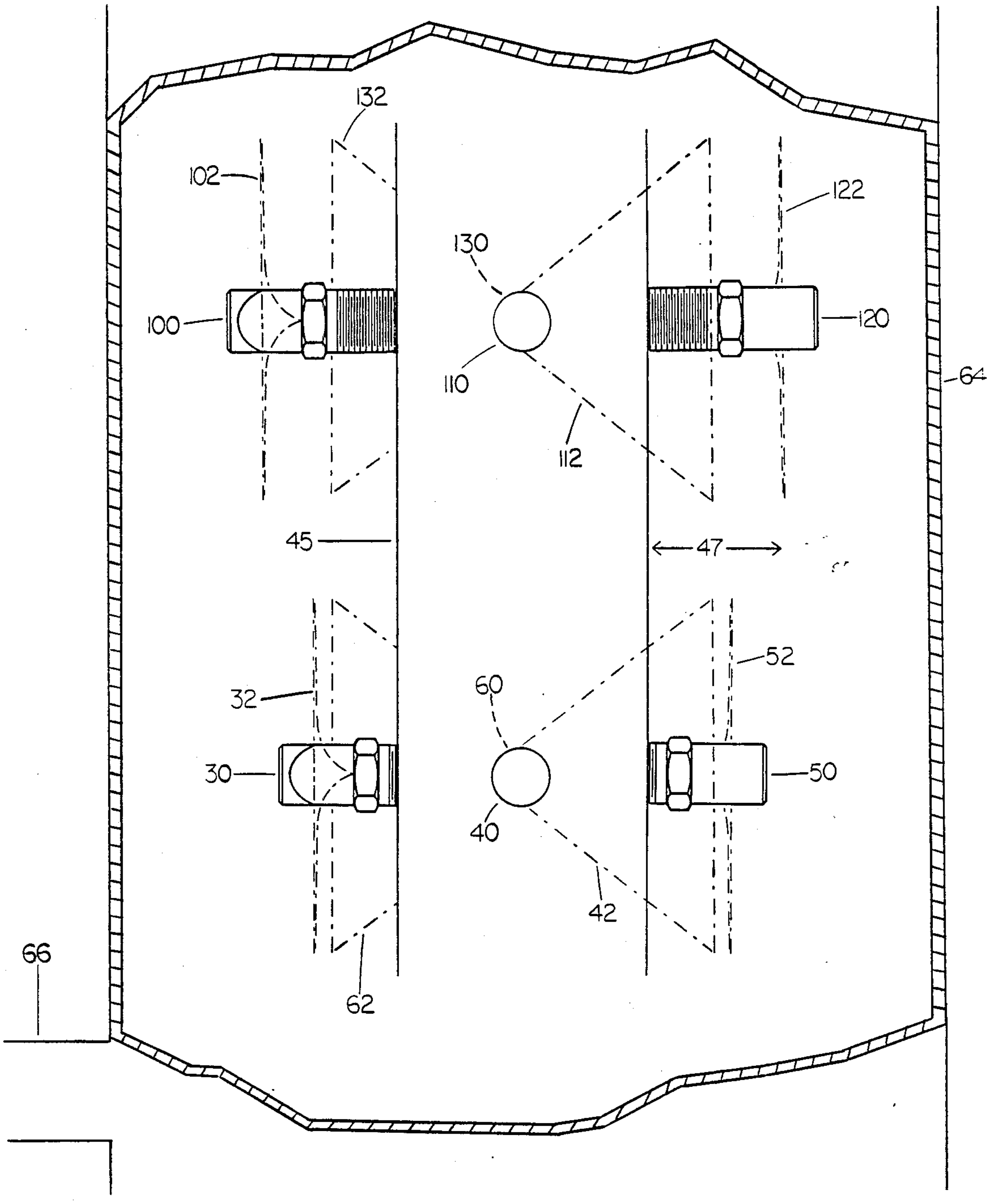
FIG. 5 is a cutaway view of a preferred embodiment of the present invention illustrating how preferred liquid atomizers can be arranged so as to provide a high degree of carbonation in a minimum amount of space.

FIG. 5 is a sectional or cutaway view of a liquid sheet carbonator illustrating how rows of four atomizers can be compactly arranged in a preferred manner to minimize sheet interference. Shown in FIG. 5 are the fan-spray atomizers 30,40, and 50 from FIG. 4. Atomizer 60 also exists, however, it cannot be shown because it lies on the other side of liquid header pipe 45 directly behind atomizer 40. It's presence is indicated at 60. All of the liquid sheets 32,42,52, and 62 can be seen. A second row of four atomizers 100,110,120, and 130 is shown adjacent to the first row of atomizers. Again for similar reasons atomizer 130 is not directly viewable although most of its liquid sheet 132 is. The arrangement of these atomizers is exactly the same as in FIG. 4 except that these atomizers 100,110,120, and 130 are at different distances 47 when compared with atomizers 30,40,50, and 60 from the liquid header pipe 45. In a similar manner liquid sheets 102,112,122, and 132 are produced from the four atomizers 100,110,120, and 130. All atomizers and the liquid header pipe are contained in a pressure vessel 64. Carbon dioxide is connected to the liquid sheet carbonator through line 66.

The basic principle in FIG. 5 is that whereas FIG. 4 utilizes two planes or dimensions of space, FIG. 5 illustrates how the third dimension is utilized. Since the sheets are ultrathin, it is possible to put rows of four atomizers, as shown in FIG. 4, very close to each other, as shown in FIG. 5, by varying the distance 47 of the row atomizers from the liquid header pipe 45. This means that the sheets 102,112,122, and 132 from the second row of atomizers are, in this illustration, a further distance from pipe 45 than the sheets 32,42,52, and 62 from the first row. Since the sheets are all parallel to one another, there is no interference between sheets from adjacent rows even though they are close to one another. The limiting factors on how close rows of atomizers can be placed are physical space requirements for the atomizers themselves and space required for insertion of new atomizers or replacements.

The following discussion will now focus on a preferred embodiment of the present invention as described in FIGS. 4 and 5 giving specific detailed dimensions for a typical 38,000 liter/hour beverage carbonator. Although specific details will be described in connection with this preferred embodiment, it will be understood that it is not intended to limit the invention to this specific embodiment or procedure. Nor is it the intent to limit the present invention to carbonation of beverages only. Further although a 38,000 liter/hour carbonator is typical of the carbonated beverage industry, it is understood that the present invention is applicable to any size carbonator that would be considered on an industrial scale.

One preferred embodiment for the carbonation of 38,000 liters/hour of beverage would consist of 48 total fan-spray atomizers each of orifice diameter 3.7 millimeters. Each atomizer would operate at a flowrate of about 13.2 liters/minute yielding a 60% approach to equilibrium or saturation of the liquid with carbon dioxide. A pressure drop through each atomizer of 200 kPa relative to the carbonator pressure would maintain this flowrate and would easily provide turbulent flow of the liquid within the sheets. Actually any pressure drop through the atomizer greater than 100 kPa will provide a sufficient degree of turbulence in the sheets to maintain 60% saturation of the liquid with carbon dioxide. This adds flexibility to the design allowing for nominal increases or decreases in the carbonator throughout. Two modules as shown substantially in FIG. 5 would be used. Each module would consist of a 38 cm. (centimeter) outer diameter pipe or pressure vessel containing a 7.6 cm. inner liquid header pipe and 24 fan-spray atomizers. The atomizers are arranged as shown in FIGS. 4 and 5 in six rows of four atomizers per row. Each row is spaced about 7.6 cm. apart. Each row would have a 2.5 cm. difference in liquid sheet distance from the feed pipe relative to adjacent rows. Each atomizer would operate at a pressure drop of about 140 to 200 kPa relative to carbonation pressure producing liquid sheets of about 8 to 10 cm. in length. The subsequently formed drops would impinge upon the walls of the pressure vessel pipe and would flow down to the reservoir. Such a system not only minimizes the diameter of the pressure vessel pipe but insures that droplets from atomizers above do not interfere with sheets formed by atomizers below. The length of the pressure vessel and liquid header pipe is approximately 100 cm. and allows for about ten seconds of liquid residence time before the liquid is sent to the filler. Of course end caps are required for the pressure vessel pipe to seal it and maintain carbonation pressure.

Thus two 38 cm. pressure vessel pipes each containing a 7.6 cm liquid header pipe and 24 atomizers will carbonate 38,000 liters or more of liquid or beverage per hour to about 60% saturation. This compares with a typical carbo-cooler from the prior art, for example, that provides about 60% saturation for 38,000 liters/-hour of beverage in a pressure vessel of approximate dimension 183 cm in height and 163 cm in diameter. This pressure vessel is very expensive because as the radius of the pressure vessel increases its thickness must also increase to prevent bursting. Further in the carbonated beverage industry materials of construction must be stainless steel which also increases costs. In contrast the present invention uses standard stainless steel pipe of small diameter that is relatively inexpensive. Example 4 illustrates the approximate savings in carbonator capital cost possible by use of the present invention instead of the prior art.

The ultimate level of carbonation desired in the beverage is a function of the total carbonation pressure and beverage temperature. For example, suppose a carbonation level of 3.7 volumes of carbon dioxide gas per volume of beverage is desired. From a standard carbonation chart the equilibrium partial pressure of carbon dioxide required at 15.6° C. is 380 kPa. However, since the carbonator achieves a 60% approach to equilibrium, a partial pressure of carbon dioxide of about 560 kPa will be required. Note that this pressure level is easily contained within a standard thin-walled stainless steel pipe of 38 cm. diameter.

As noted earlier the carbonated beverage industry generally deaerates the liquid prior to carbonation. The present invention is equally applicable to this deaeration. In fact the approach to equilibrium is generally higher for oxygen desorption than for carbonation. This is true because the molecular diffusion coefficient for oxygen in aqueous solution is about 20% higher than for carbon dioxide. Further the temperature for deaeration is generally higher than the temperature of carbonation which also increases the molecular diffusion coefficient. Increasing the diffusion coefficient decreases the time required for oxygen to diffuse out of the liquid as shown in Equation 1. For a deflected fan-spray atomizer of orifice diameter 3.7 mm, the approach to equilibrium for stripping oxygen out of the liquid is about 75%. If higher deaeration is desired the orifice diameter can be decreased or deaerator modules can be used in series. A preferred embodiment of the present invention as shown in FIG. 5 can easily be modified for deaeration of the liquid by simply connecting a source of vacuum through line 66 shown in FIG. 5. Clearly the present invention as applied to deaeration is most applicable if the carbonator design is to be modular because then the deaerator design would also be modular.

Any device that forms an ultrathin liquid sheet can be used for the practice of the present invention. It is important, however, that the residence time of the sheet and the diffusion time of the component be of the same order. In this respect liquid atomizing devices are particularly preferred. In addition to the deflected fan-spray and jet-impingement atomizers already discussed, some other examples of atomizing devices applicable to the present invention are whirl (or swirl) chamber-hollow cone atomizers, oval-orifice fan-spray atomizers, centrifugal atomizers, rotary atomizers, rotary disc wheel or cup atomizers, etc.

Obviously other preferred atomizer configurations besides those illustrated in FIGS. 4 and 5 are possible. Baed on the previous discussion of principles of liquid sheet carbonator design, these other preferred embodiments are self-evident to those skilled in the art. However, one inner pipe with rows of atomizers closely spaced on it inside a larger pipe that acts as a pressure vessel is a preferred means of operation yielding lower carbonator capital costs. To achieve high total carbonation rates the option of using modules operated in parallel is obvious. Also multiple inner pipes containing rows of atomizers all within a single pressure vessel pipe is another option. However, the use of multiple inner pipes has a distinct disadvantage in that it necessarily causes an increase in the pressure vessel diameter and therefore the pressure vessel wall thickness.

The important factors in designing a liquid sheet carbonator are the degree of carbon dioxide saturation desired, the requirement of no sheet to sheet impingement, minimization of droplets from upper sheets falling on lower sheets, physical space requirements of nozzles and their installation, and practical residence time ahead of the filler. The residence time is not required for carbon dioxide absorption; the milliseconds of sheet residence time of the present invention as illustrated by the preferred embodiment provide all the absorption. Residence time is only required as a practical matter ahead of the filling operation.

Further as noted earlier, the droplets formed after sheet disruption are not required for increasing the carbonation level of the liquid as discussed in the preferred embodiment of the present invention. However, designs are easily envisioned that make use of these droplets to further increase the carbonation level above that achieved in the liquid sheets. As shown in Example 3 a limited amount of sheet interference even by droplets can be tolerated. However, a substantial amount of subsequent absorption of carbon dioxide by these droplets requires droplet residence times on the order of tenths of a second to seconds. Further since the droplets are moving at fairly high terminal velocities, the length of the pressure vessel would be substantially increased. In contrast, the present invention allows for a very compact design achieving high carbonation levels in milliseconds.

It is obvious to those skilled in the art that carbonation achieved in milliseconds necessarily yields very compact designs. In theory it would be possible to stack the ultrathin liquid sheets of the present invention directly on top of each other. This would yield a carbonator of incredible compactness when compared with its throughput. However, in practice, atomizers and pipes require some physical space. The preferred embodiment previously discussed has attempted to account for these space requirements as well as the space required for routine maintenance and atomizer replacement. The intent is to present a preferred embodiment of practical design that can be easily utilized by the industry.

Although the discussion presented here is primarily focused on the carbonated beverage industry, it is obvious that the present invention is applicable to other carbonation processes. If higher approaches to equilibrium or saturation level of carbon dioxide in the liquid are desired, the modular design of the present invention allows for carbonators to operate in series. For example, suppose an approach to equilibrium or saturation level of carbon dioxide of 94% were desired in a liquid such as water. This level could be achieved by using three modules that operate in series with each module individually achieving an approach to equilibrium of 60%.

Although a specific embodiment has been presented detailing its dimensions, it is obvious that other variations and modifications are possible in using a liquid sheet carbonator. Indeed one of its major advantages is the extreme flexibility afforded by the liquid sheet carbonator in comparison to the prior art. The detailed embodiment described here is a preferred means because it provides substantial savings in capital cost yet affords flexibility in virtually all operating parameters.

A further disclosure of the nature of the present invention is provided by the following specific examples of the practice of the invention. It should be understood that the data disclosed serve only as examples and are not intended to limit the scope of the invention.

EXAMPLE 1

Carbonation of water exposed as a thin liquid sheet is illustrated as follows. Water is pumped through a deflected fan-spray atomizer of orifice diameter 2.95 mm. The atomizer is contained inside a plexiglass vessel connected to a source of carbon dioxide of 99.93% purity. The pressure of carbon dioxide within the vessel is 240 kPa and the temperature of the water is 20° C. The pressure drop through the atomizer is 180 kPa. The atomizer is situated so that the droplets formed after sheet disruption immediately strike the pressure vessel wall so as to render them ineffective in further increasing absorption of carbon dioxide. The carbonated water exiting the vessel was tested for carbon dioxide by immediately placing about a 200 milliliter (ml) sample in about 40 ml of 1 N (Normal) sodium hydroxide. This prevented the loss of carbon dioxide to the atomosphere by converting volatile carbon dioxide to nonvolatile sodium carbonate. The sample was then back titrated with 0.2 N HCl to determine carbon dioxide content. The sample was found to contain 2520 ppm (parts per million) carbon dioxide. The maximum or equilibrium value that water could contain at 240 kPa of carbon dioxide partial pressure and at 20° C. is about 3950 ppm. Therefore, the approach to equilibrium or percent saturation is about 64%.

EXAMPLE 2

The effect of sheet interference is illustrated as follows. In the apparatus discussed in Example 1 a fan-spray atomizer of orifice diameter 1.85 mm was used. The partial pressure of carbon dioxide gas was 170 kPa, the orifice pressure drop was 207 kPa, and the liquid temperature was 20° C. The atomizer was positioned approximately 2.0 cm. from the wall of the vessel so as to prematurely disrupt the liquid sheet that would otherwise be about 3.5 to 4.0 cm. long. An approach to equilibrium of 62% was obtained when 77% was typical for a full-length uninterrupted liquid sheet. The sampling method was similar to that used in Example 1.

EXAMPLE 3

A further example of sheet interference is illustrated as follows. In the apparatus described in Example 1 two fan-spray atomizers were positioned so that their sheets would impinge upon one another at approximately 8.0 cm. from each atomizer. The condition of the test were; carbon dioxide partial pressure of 170 kPa, atomizer pressure drop of 120 kPa, and liquid temperature of 16° C. Under these conditions the sheet length is normally 8.5 to 9.0 cm. if not prematurely interrupted. An approach to equilibrium of 53% was obtained when 55% was typical for a full-length unobstructed liquid sheet.

EXAMPLE 4

An approximate illustration of the savings in capital equipment possible by using the present invention over the prior art follows. The design conditions of 38,000 liters/hour of beverage to be carbonated, pressure vessel rated at 800 kPa, and a 60% approach to equilibrium were used. The design for the present invention has already been discussed. It consists of two carbonation modules with each module consisting of a 38 cm. by 100 cm. stainless steel pipe pressure vessel, one internal 7.6 cm. stainless steel pipe, and 24 stainless steel atomizers. The costs for the purchased equipment are approximately $1800 for the two pressure vessel pipes including four end caps, $100 for the inner pipes, and $1400 for the 48 atomizers in 1985 dollars. This compares with one example of the prior art as previously discussed that requires a pressure vessel of 163 cm. in diameter and 183 cm. in height. The cost of the pressure vessel alone in stainless steel estimated from the correlation given by Mulet, Corripio, and Evans in Chem. Eng., 88(20), Oct. 5, 1981, p.145 is about $25,000 in 1985 dollars. This is almost eight times the cost of the materials required for the preferred embodiment of the present invention. The reader should note that the cost of internals for the prior art has not been included because these internals are plates that cool as well as flow the liquid in a thin film. The present invention as described in a preferred embodiment will not cool the liquid within the carbonator. However, since the present invention carbonates in an extremely uniform manner within milliseconds, cooling of the liquid may not be required. Although cooling does allow carbonators to operate at lower total pressures, this is not a problem when standard, small diameter pipe is used as a pressure vessel. Typically these standard pipes will easily withstand pressures of 3500 kPa or greater. Ultimately the question of whether refrigeration is required depends on the amount of carbon dioxide lost during the filling operation.

Thus the reader will see that the liquid sheet carbonator provides extremely rapid absorption yet is a very compact and inexpensive device. While the above description contains many specificities, these should not be construed as limitations on the scope of the invention, but rather as an exemplification of one preferred embodiment thereof. Many variations on the preferred embodiment are possible because of the extreme flexibility afforded by the use of very thin liquid sheets. Some variations such as multiple inner pipes and operation of carbonators in series and/or parallel have already been discussed. Accordingly, the scope of the invention should be determined not by the embodiment illustrated, but by the appended claims and their legal equivalents.

I claim:

1. A method of rapidly absorbing in liquids substantial amounts of carbon dioxide comprising the steps of:
   - (a) forming a plurality of continuous liquid sheets from said liquids in a free-space environment consisting of carbon dioxide, each of the liquid sheets expands in width and decreases in thickness;
   - (b) increasing the velocity of said liquid sheets formed in said environment such that said liquid sheets are in turbulent flow, whereby substantial amounts of carbon dioxide are absorbed by the liquid sheets in the free-space environment.
2. A method as in claim 1 wherein said liquid sheets are formed by liquid atomizing devices.
3. A method as in claim 2 wherein said liquid atomizing devices are deflected fan-spray atomizers.
4. A method as in claim 2 wherein said liquid atomizing devices are jet-impingement atomizers.
5. A method as in claim 2 wherein said liquid atomizing devices are swirl chamber-hollow cone atomizers.
6. A method as in claim 2 wherein said liquid atomizing devices are oval-orifice, fan-spray atomizers.
7. A method as in claim 2 wherein said liquid atomizing devices are centrifugal atomizers.
8. A method as in claim 2 wherein said liquid atomizing devices are rotary atomizers.
9. A method as in claim 2 wherein said liquid atomizing devices are rotary disc wheel atomizers.
10. A method for the carbonation of a liquid comprising the steps of:
    - (a) deaerating said liquid in a vacuum environment to obtain a deaerated liquid;
    - (b) forming a plurality of continuous liquid sheets from said deaerated liquid in a free-space environment consisting of carbon dioxide, each of the liquid sheets expands in width and decreases in thickness;
    - (c) increasing the velocity of said liquid sheets formed in said free-space environment such that said liquid sheets are in turbulent flow, whereby substantial carbonation of the liquid sheets is obtained in the free-space environment.

* * * * *